June 7, 1966    M. STAUNT ETAL    3,254,646
DENTAL SYRINGES
Filed Aug. 20, 1962    3 Sheets-Sheet 3
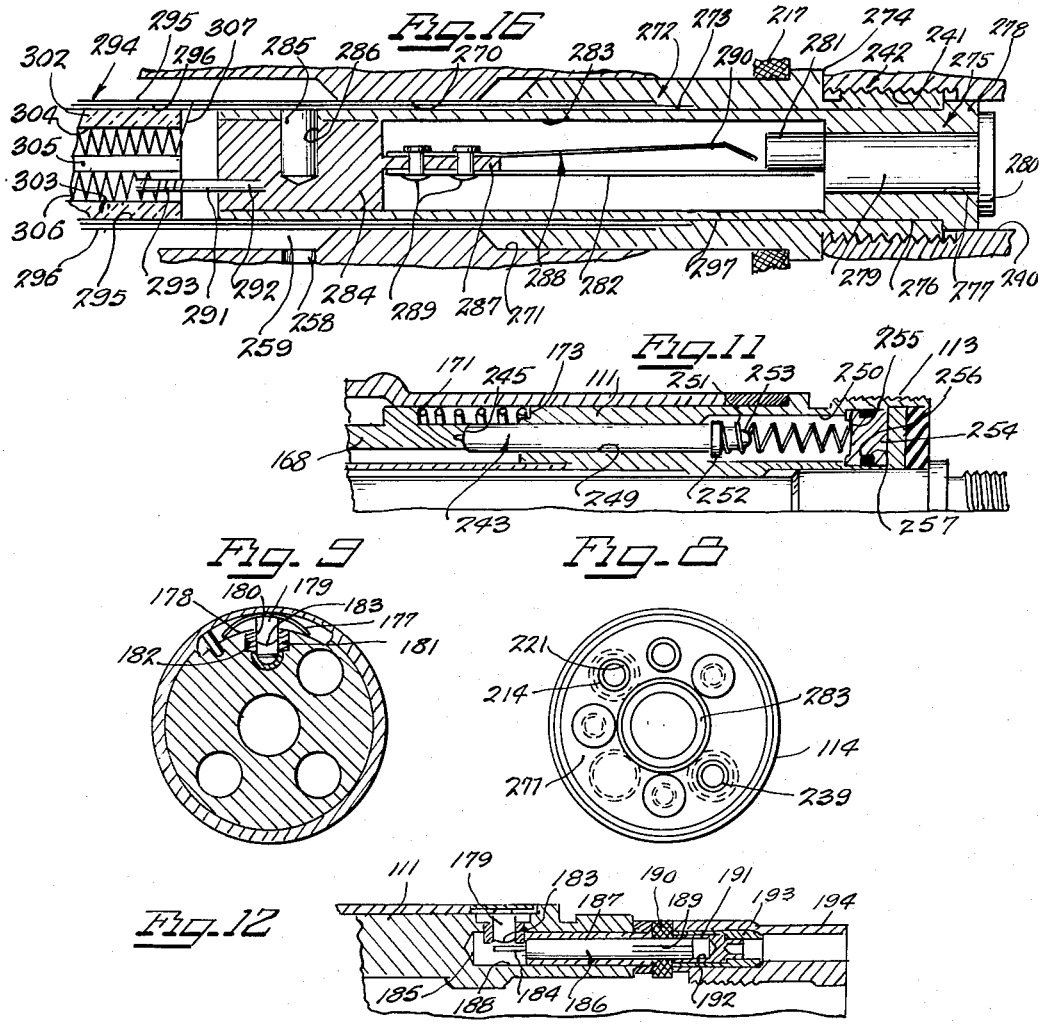
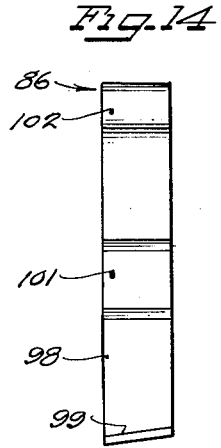
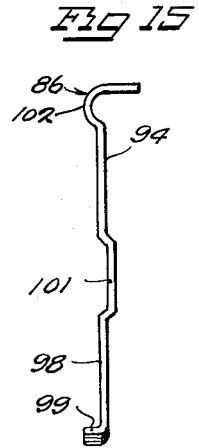
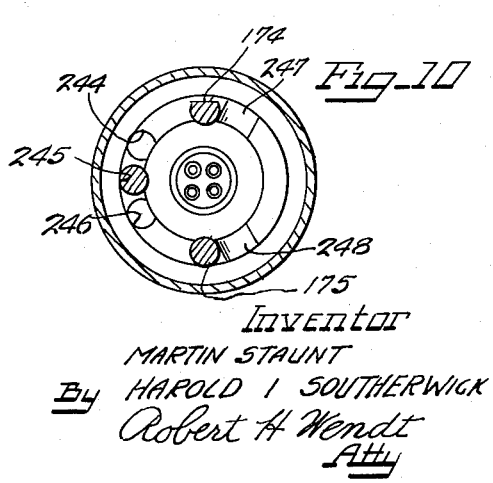
Inventor
MARTIN STAUNT
HAROLD I SOUTHERWICK
By Robert H Wendt
Atty United States Patent Office
3,254,646
Patented June 7, 1966

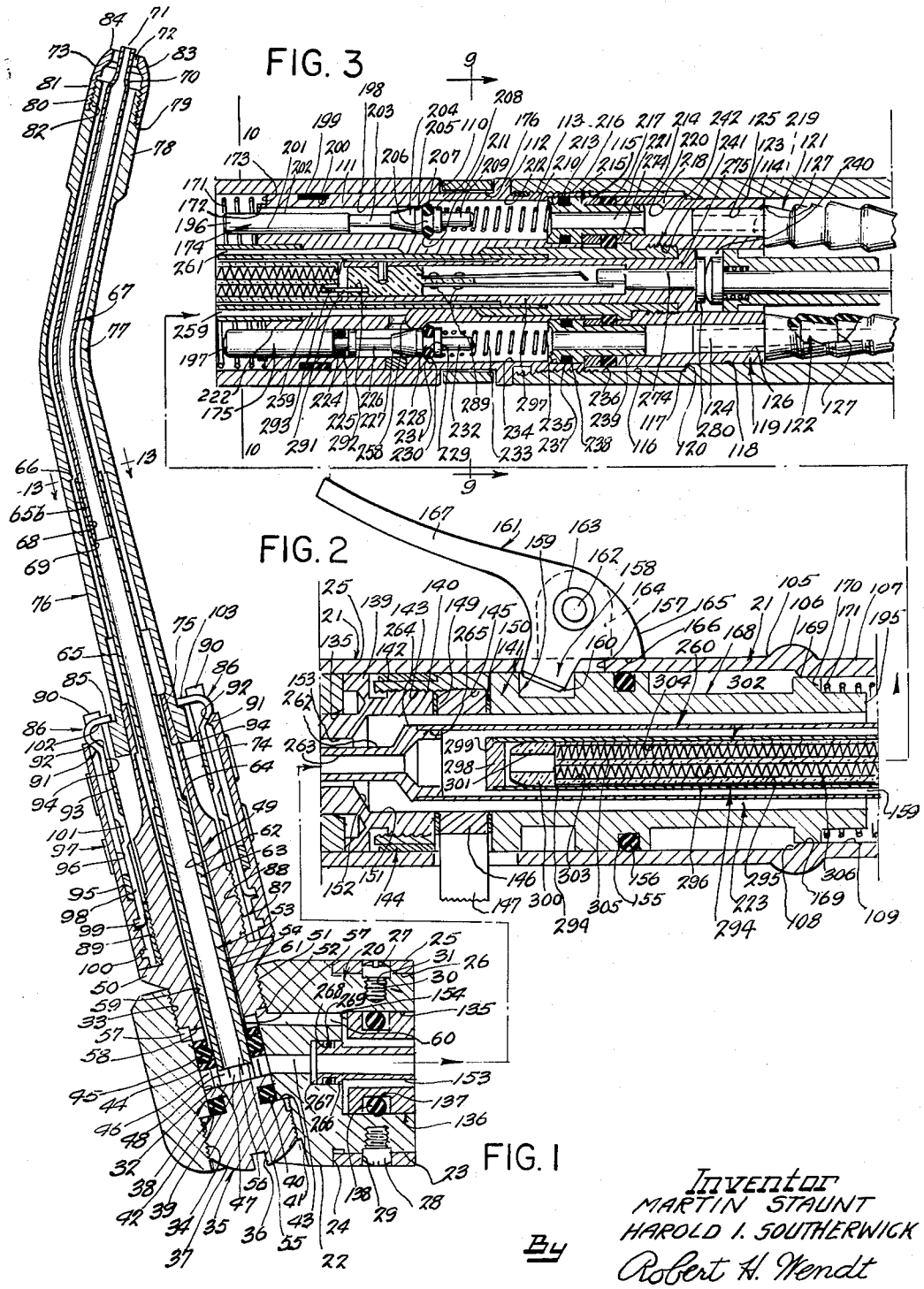

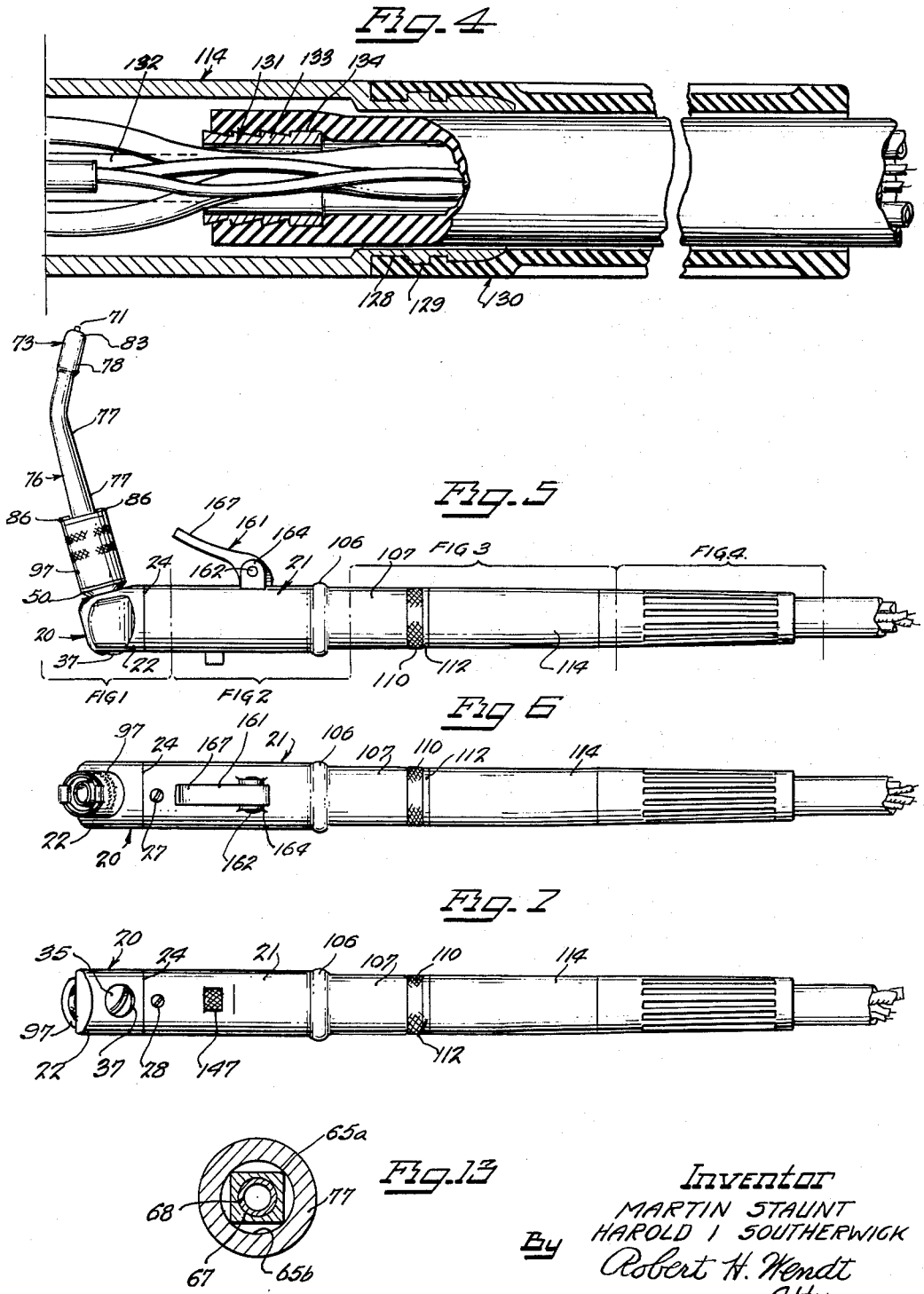

3,254,646
DENTAL SYRINGES
Martin Staunt, Des Plaines, and Harold I. Southerwick, Mount Prospect, Ill., assignors, by mesne assignments, to American Hospital Supply Corporation, Evanston, Ill., a corporation of Illinois
Filed Aug. 20, 1962, Ser. No. 217,799
6 Claims. (Cl. 128—224)

The present invention relates to dental syringes, and is particularly concerned with the provision of an improved dental syringe which is adapted to provide the dentist with a source of warm air, warm water, cold air and cold water and also with a warm spray of air and water and a cold spray of air and water.

One of the objects of the invention is the provision of a syringe which is to combine in a single instrument all of the functions required by the dentist in his operative techniques, thereby eliminating the former multiplicity of instruments required and the loss of time which is caused by laying down one instrument and picking up another.

Another object of the invention is the provision of an improved dental syringe which provides a source of warm water and a source of warm air, in which there is an electric heating element which is surrounded by the water to be heated and in which the water to be heated is also surrounded by the air in the syringe, the surrounding air providing an insulating blanket to retard the outward conduction of heat to the outer sheath, so that the outer sheath may be maintained sufficiently cool to be held comfortably in the hand of the user.

Another object of the invention is the provision of a simple type of thermostatic control which may be adjusted as desired and in which the patient and the dentist are adequately insulated from any high voltage electric current.

Another object of the invention is an improved dental syringe which is electrically heated and thermostatically controlled and the control is made responsive to the temperature of the heating element in order to reduce the effect of thermal inertia.

Another object of the invention is the provision of a detachable nozzle which can be readily removed from the syringe so that a spray bottle may be substituted containing medication solution which is used by dentists to spray the mouth prior to the commencement of dental procedures.

Another object of the invention is the provision of a dental syringe which will provide a source of water which may be heated and controlled to a temperature of between 95 degrees and 98 degrees F., even though the temperature of the supply water be as low as 35 degrees Fahrenheit.

Another object of the invention is the provision of an improved dental syringe construction which is simple, which has a minimum number of parts, which may be economically manufactured, and the thermostatically controlled part of which may be replaced conveniently by merely unscrewing the sheath.

One of the further objects of this invention is the provision of a dental syringe in which all of the normal functions of several syringes normally used are combined in one instrument for the purpose of conservation of space and simplification of dental operating procedure.

Another object of the invention is to provide an improved dental syringe (1) Having a source of warm water which may be used to rinse out tooth cavities in the course of their preparation, for the reason that warm water is more comfortable to the patient and does not provide a thermal shock to the patient when the cavity extends close to pulp areas;

(2) A source of warm air which is used for drying the cavities in preparation for the filling of the cavity;

(3) A warm air-water spray which may be used in cases where the doctor has an assistant to apply the spray in addition to the handpiece spray and where the air velocity and water aids in rinsing the teeth;

(4) A source of cold water which may be used both inside and outside the mouth to harden wax impressions and to be used with hydro-colloid tray preparations;

(5) A source of cold air which may be used mainly outside the mouth to clear away grinding dust which is produced when adjusting dentures, inlays, etc.;

(6) A source of cold air-water spray, because mixed cold water and cold air provides faster cooling due to the more rapid evaporation that results when fine particles of water are mixed with air in an expanding spray.

Other objects and advantages of the invention will be apparent from the following description and the accompanying drawings, in which similar characters of reference indicate similar parts throughout the several views.

Referring to the drawings, of which there are three sheets,

FIG. 1 is an enlarged fragmentary sectional view taken through the nozzle and head section of the syringe on a plane which lies in the axis of the syringe and which forms a continuation of the next view;

FIG. 2 is an enlarged fragmentary axial sectional view forming a continuation toward the right of FIG. 1, illustrating the middle portion of the syringe;

FIG. 3 is an enlarged fragmentary axial sectional view, illustrating that portion of the syringe which extends toward the right of FIG. 2 containing a portion of the heaters, air and water valves and the electrical connections;

FIG. 4 is an enlarged fragmentary axial sectional view of the right end of the syringe, forming a continuation to the right of FIG. 3;

FIG. 5 is a reduced side elevational view of the exterior of the syringe which is included in FIGS. 1–4;

FIG. 6 is a top plan view of the syringe with the removable nozzle detached;

FIG. 7 is a bottom plan view of the syringe;

FIG. 8 is a representative view taken on the plane of the line 8—8 of FIG. 3, looking in the direction of the arrows;

FIG. 9 is a sectional view taken on the plane of the line 9—9 of FIG. 3, looking in the direction of the arrows;

FIG. 10 is a sectional view taken on the plane of the line 10—10 of FIG. 3, looking in the direction of the arrows;

FIG. 11 is an enlarged partial view of FIG. 3;

FIG. 12 is an enlarged partial view of FIG. 3;

FIG. 13 is a sectional view taken on the plane of the line 13—13 of FIG. 1, looking in the direction of the arrows;

FIG. 14 is a side elevational view taken from the left of FIG. 15;

FIG. 15 is an edge elevational view taken from the right of FIG. 14;

FIG. 16 is an enlarged fragmentary sectional view taken on the same plane as FIG. 3.

Referring to FIG. 1, 20 indicates the brass body of the head end of the syringe which is carried by the sheath 21 made of stainless steel and housing the main parts of the syringe in its handle.

The body 20 comprises a cylindrical metal member having an exterior cylindrical surface 22 and having a reduced cylindircal portion 23 extending to the right from the annular shoulder 24.

The sheath 21 comprises a stainless steel tube having an outer cylindrical surface 25 and an inner cylindrical bore 26 fitting on the reduced portion 23 of the body 20, where it is secured by a plurality of screw bolts 27 located with their heads 28 in the bores 29 of the sheath and having their threaded shanks 30 threaded into the bores 31 in the body 20 (FIG. 1). The heads 28 prevent the sheath from moving off the reduced portion 23.

The body 20 has a through bore 32 extending at an obtuse angle to the left in FIG. 1; and the through bore communicates with a threaded enlarged counterbore 33 at its upper side and a second enlarged threaded counterbore 34 at its lower end.

As shown in FIG. 1, lower threaded bore contains a threaded plug 35 having a screwdriver slot 36 in its rounded end 37; and the threaded plug 35 has a reduced cylindrical portion 38 which fits in the through bore 32 and has a rectangular groove 39 receiving a resilient rubber O ring 40 which is compressed in the groove by the walls of the bore 32, establishing a water seal at this end of the bore.

The plug is threaded home with its end 41 against an annular shoulder 42. The reduced portion 38 of the plug 35 extends past an axial bore 43 in the body 20, having the end 44 of the plug engaging a resilient rubber O ring 45 in the bore 32.

The reduced portion 38 of the plug has a rectangular annular groove 46 extending about the reduced portion 38; and the annular groove 46 is provided with a plurality of radially extending holes 47 communicating with an inner bore 46 in the end of the plug 38.

Thus the channel 43 communicates with the inside of the bore 48 in the plug 35.

The nozzle supporting head 49 comprises a cylindrical metal body which may be made of brass, having a radical annular flange 50 and a reduced threaded shank 51 which is threaded into the bore 33 (FIG. 1).

The threaded shank 51 has a reduced cylindrical portion 52 which extends into the bore 32. Extending through the shank is a nozzle tube 53. The exterior cylindrical surface 54 of the tube 53 sealingly engages the O ring 45.

The nozzle tube 53 extends into the bore 48 in the plug 35, ending at 55, where its open end 56 communicates with the water channel extending from 43. The shank 51 of the nozzle head 49 communicates with an annular air space at 57 about the reduced portion 52, and there are a plurality of radial apertures 58 extending through the reduced portion 52 into an internal cylindrical bore 59 (FIG. 1).

The body 20 also has an axially extending air channel 60 extending to the air space 57 and communicating with the air bore 59 about the external cylindrical surface 61 of the nozzle tube 53. The stainless steel water nozzle tube 53 comprises an elongated tube having a cylindrical bore 62; and its lower portion has a thicker wall 63 ending at the annular shoulder 64 (FIG. 1).

Referring to FIG. 13, from the annular shoulder 64 to the end 66 the nozzle tube 65 has an outer square cross-section and its corners 65a engage the inside of the core 65b, as shown in FIG. 13, leaving the flat sides of the tube 65 spaced from the inner walls 65b for the flow of air.

The water nozzle tube has a spout extension 65 which extends to its end 66, where it is adapted to receive the curved nozzle tube 67 with its end fitting in the bore 68 against an annular shoulder 69.

The curved nozzle tube 67 has a reduction 70 in size near its nozzle end 71, which extends slightly beyond the air aperture 72 in the nozzle cap 73 (FIG. 1). Thus the air from the nozzle cap 73 surrounds the water discharged from the end 71 and is adapted to atomize the water into a spray when both are turned on.

The nozzle supporting head 49 has a reduced frusto-conical end portion 74 which is adapted to receive the complementary tapered bore 75 in the curved nozzle body 76. This tapered bore 75 and the conical end 74 effect an airtight fit between the curved nozzle body and the nozzle supporting head 49.

Both the inner tube 67, which carries water, and the outer curved nozzle body 76 have an obtuse bend at 77; and there is an enlarged cylindrical body 78 at the end of the nozzle body. This enlarged body 78 has an annular shoulder 79 and a reduced threaded end portion 80.

The nozzle cap is a cylindrical metal member having an outer cylindrical surface 81 and a threaded bore 82 receiving the threaded portion 80. The cap 73 has a rounded end surface 83 and a flat end 84 surrounding the aperture 72, which is a cylindrical bore.

The cylindrical bore 72 discharges air when turned on; and the nozzle tip 71 discharges water when turned on. When both water and air are turned on, a water spray is effected.

The curved nozzle body 76 has an annular shoulder 85 which is engaged by a pair of spring steel jaws 86, 86, identical in construction, and carried by a tubular body 87. The tubular body 87 may comprise a brass tube having inner threads 88 for engagement with the outer threads 89 on the nozzle head 49.

The tubular body 87 extends beyond the shoulder 85 and is provided with a pair of longitudinal slots 90, 90 for receiving the two jaws 86. At 91, 91 the tubular body 87 has a triangular camming formation extending across the slots 90 and engaging the sloping portion 92 on each of the jaws.

At 93 the tubular body 87 has a rectangular strap engaging the inner surface 94 of each jaw and extending across the slots 90.

The part 95 comprises a separate rectangular ring which is mounted around the jaws 86 in an enlarged counterbore 96 in the jaw nut 97. Each jaw has a straight shank 98 of rectangular shape which is provided with an inwardly turned end 99 (FIGS. 14 and 15) engaging in a rectangular helical groove 100 (FIG. 1).

At its mid point each jaw has an offset portion 101 which may act as a stop for limiting the reciprocating movement of the jaws that is brought about by the helical groove 100. At its extreme end each jaw is curved outward at 92 and bent inward at 102 and provided with an inwardly extending holding jaw 103.

The nut 97 is mounted on the tubular member 87 and jaws 86 after the ring 95 has been placed about the jaws; and the nut 97 is assembled with the foregoing parts by being slid over the jaw assembly from the bottom. Thereafter the nut and jaw assembly are threaded on the threads 89 of the nozzle supporting head 49.

The outer surface of the nut 97 may be knurled to facilitate rotating the nut. When the nut 97 is turned toward the right, the jaws 86 may be drawn into engagement with the annular shoulder 85. When the nut is turned in the other direction, the jaws are released and the nozzle tube 53 may be removed along with the nozzle body 76.

Referring to FIGS. 1 and 2, FIG. 2 shows the structure of the syringe extending to the right from FIG. 1. The sheath 21 is of uniform diameter until the point 105, where the sheath 21 is formed with an external rib 106 and thereafter has a smaller outside diameter at 107.

From the inner annular shoulder 108 the sheath also has a smaller inside diameter 109.

Referring to FIG. 3, the sheath 21 is of uniform diameter outside and inside until its end 110. At this end of the sheath the sheath is filled by a cylindrical brass body 111 fitting inside the bore 109 and providing support for air and water valves and other parts.

The brass body 111 has a rectangular annular outer rib 112 and is provided with an outer threaded portion 113 for receiving the rear sheath 114 having inner threads 115 threaded against the rib 112.

The rear sheath 114 has an enlarged bore 116 and an annular shoulder 117 at the beginning of a smaller bore 118. 119 indicates a cylindrical plug which fits in the bore 118 and has an annular shoulder 120 engaged by the shoulder 117 on the rear sheath.

The cylindrical plug 119 is provided with a tubular air hose fitting 121 and a water hose fitting 122, each of which has its shank 123, 124 frictionally fitted in a cylindrical bore 125, 126. Each hose fitting 121, 122 has external ribs 127 for retaining a flexible air hose and a water hose which pass out of the right end of the sheath.

At its right end, referring to FIG. 4, the rear sheath 114 has a reduced diameter portion 128 and a radially projecting rib 129 upon which a rubber hose 130 is fitted and extends to the right to protect the hoses and electric conduit against sharp bending.

A tubular metal anchor member 131 is secured in the rear sheath 114 by a pair of longitudinal frame members 132 carried by the valve plug 119 and tubular member 131 has retaining ribs 133 upon which a rubber hose 134 is mounted for containing the air hose, water hose, and insulated electric conductors.

Referring back to FIGS. 1 and 2, the brass body 20, on which the sheath 21 is mounted, is provided with an internal cylindrical bore 135 for receiving a cylindrical guide 136 which forms a part of a sliding valve selector.

The cylinder 136 has a rectangular groove 137 containing a resilient rubber O ring 138 establishing a seal for air in the bore 135. The cylinder 136 has an annular enlarged cylindrical portion 139 which is joined to a reduced cylindrical threaded portion 140.

The valve selector body 141 comprises a cylindrical brass body slidably mounted in the sheath bore 26 and having a reduced cylindrical separate end member 142 provided with internal threads 143 for engaging the threads 140. The reduced end 142 is surrounded by a metal band 144 which slides in the sheath and maintains the constant size of the reduced end 142 (FIG. 2).

The valve selector body 141 has an enlarged bore 145 for receiving a rectangular annular collar 146 having a radially projecting serrated thumb piece 147, the serrations of which are shown at its end 148 in FIG. 10. The collar 146 is confined between a pair of resilient gaskets 149 and 150 in the bore 145.

The valve selector body 141 and the collar 146 have a continuous cylindrical bore 151 for passage of air; and the bore is tapered at 152 and communicates with a smaller bore 153 which communicates with the passage 60 at the end 154 of the cylindrical body 136. The valve selector body has an external cylindrical surface, and the body 141 is mounted for sliding movement in the bore 26 of the sheath 21.

The body 141 has a peripheral groove 155 which is filled with a rubber O ring 156 engaging the inside of the sheath and establishing an air seal at this point. The sheath 21 is provided toward the left of the O ring 156 with a through slot 157 for passing a cylindrical lug 158 through the sheath and into an annular rectangular groove 159 in the valve selector body 141.

The end of the lug 158 is beveled at 160 and the lug 158 is carried by a hand lever 161 which is pivotally mounted on a pin 162 located in a bearing bushing 163 which is carried by a pair of fixed pivot flanges 164, one on either side of the rectangular aperture 157.

The hand lever 161 has a rearwardly projecting heel 165, the inner surface 166 of which constitutes a stop limiting the outward movement of the lever extension 167, which may be pressed down toward the shield 21, but is urged outward by the axial movement of the body 141 acting on the lug 158.

The valve selector body 141 has a peripheral groove 168 to the right of the O ring 156 and has a portion of reduced diameter, indicated at 169, sliding in the bore 109 and provided with an annular shoulder 170 engaged by a coil spring 171.

The coil spring 171 is seated about a reduced diameter 172 and engages the annular shoulder 173 of a valve supporting body 111 comprising a cylindrical brass member which is fixed in the sheath 21 and carries a pair of valves, such as the air valve 174 and the water valve 175.

The valve supporting body 111 has an annular outer rib 112 which is spaced from the end 110 of the sheath 21, leaving a cylindrical portion 176 for supporting a contact actuating spring 177. Referring now to FIG. 9, the spring 177 comprises an arcuate leaf spring located in a slot 178 and having a plunger contact 179, as shown in FIG. 9, riveted to the spring 177 so that the plunger contact 179 is mounted for sliding movement in a bore 180 in an insulating body 181 located in a radial bore 182.

Referring to FIG. 12, the contact 179 has a lower rounded end 183 adapted to engage a terminal extension 184 located below the contact 179 in the space 185; and the extension is a part of a terminal 186 which is located in an insulating sleeve 187 frictionally mounted in a longitudinal bore 188 in the end of the valve supporting body 111 (FIG. 12).

The terminal 186 has a split end 189 extending through a rubber gasket 190 and is adapted to be engaged by a connector 191 having a complementary bore 192 also mounted in an insulating sleeve 193 in a body 194 which houses an electrical conductor connected to the connector 191 (FIG. 12).

When the spring 177 is pressed, the electric circuit is completed through the outer sheath of the heater element.

The valve selector body 141 is shown at the left of its range of movement with the annular end 195 of the valve selector body spaced from the rounded ends 196 and 197 of the air valve 174 and the water valve 175 so that the valve selector body is in position to actuate one or the other or both these valves when the valve selector body 141 is moved to the left by pressing the lever 167 toward the sheath 21.

The valve supporting body 111 comprises a cylindrical brass member fitting in the sheath 21 at the right end; and the valve supporting body has an axially extending bore 198 eccentrically located in the body at the top of FIG. 3.

At 199 the body 111 has a groove 200 receiving a resilient gasket 199 to effect an air seal.

The air valve 174 comprises a cylindrical brass plunger which has a cylindrical body 201 with a flat side 202 to provide a clearance in the bore 198. The valve body 174 has a reduced cylindrical stem 203 and a frusto-conical extension 204 and a cylindrical portion 205 provided with a peripheral circular groove 206 containing a rubber O ring 207 protruding from the groove (FIG. 3).

The valve body has a cylindrical portion 208 and a cylindrical extension 209 about which a valve spring 210 is located.

Bore 198 ends at a frusto-conical surface 211 in an enlarged counterbore 212 for receiving the spring; and the O ring 207 constitutes the air valve engaging the seat 211 to shut off or turn on the air.

The body 111 has an enlarged counterbore 213 extending from the bore 212 and is adapted to receive a brass plug 214 fitting in the counterbore 213 and providing a seat for the spring 210. The plug 214 has a peripheral groove 215 for receiving a rubber O ring 216, effecting a seal in the counterbore 213; and there is a rubber plug 217 surrounding the plug 214 and engaged by an air connecting body 218 which carries the air connecting fitting 121 to be connected to an air hose (FIG. 3).

The fitting 121 has an air conduit 219 communicating with the bore 220 leading to the bore 221 in the plug 214 and extending to the bore 212 which is controlled by the valve 207 comprising an O ring.

The valve supporting body 111 is also provided with a cylindrical bore 222 for slidably supporting the water valve, which projects from the bore 222 into the air space 223 in the bore 151.

The water valve 175 has a peripheral groove 224 receiving the O ring 225 for effecting a seal against leakage of water to the left. The valve 175 has a stem 226 of reduced diameter extending to a frusto-conical portion 227 which supports a cylindrical body 228 having a peripheral groove 229 containing a rubber O ring 230.

The rubber O ring engages a frusto-conical valve seat 231 and the valve has a cylindrical reduced diameter stem 232 providing a seat for a helical compression spring 233 which is located in the counterbore 234.

The valve supporting body 111 has an enlarged counterbore 235 for receiving a cylindrical brass plug 236 which has a peripheral groove 237 containing a rubber O ring 238, effecting a seal in the counterbore 235.

The plug 236 has an extension 239 of reduced size and a gasket surrounding the plug and engaged by the body 218. The body 218 has a bore 126 for receiving the shank 124 of a fitting 122 for attaching the water hose.

The body 113 is secured by the annular shoulder 117 inside the rear sheath 114 engaging the annular shoulder 120 on the member 119.

The plug 119 also has a central bore 240 which is threaded at its left end 241 to engage the threads 242 in the body 218.

The air valve 174 and the water valve 175 are each adapted to throttle the amount of air and water, respectively to the tapered surfaces 204 and 227, which increase the opening as each valve is moved toward the left.

Referring to FIG. 11, the valve actuator 168 is urged toward the left by a spring 171 which is seated against the surface 173 of the valve supporting body 111.

The valve actuating member 168 may also be rotated by means of the valve selector 147 into any one of three positions; and the valve selector 168 is adapted to engage a detent plunger 243, which has a rounded end to be engaged in any one of three different sockets 244, 245, 246 (FIG. 10).

When the valve selector 168 is rotated by means of its projecting lever 147 until the detent plunger 243 engages in socket 244, the selector is in position to engage the air valve 174. When the valve selector 147 is urged toward the right in FIG. 10 and the detent plunger 243 is engaged in the socket 246, the valve selector is adapted to actuate the water valve 175.

When the valve selector has its detent plunger 243 engaged in the socket 245, the valve selector is in position to actuate both the air valve 174 and the water valve 175.

The areas 247 and 248 on the end of the valve selector 168 comprise notches that slide over the valve plungers 174 and 175, respectively, so that one or the other of the valve plungers is rendered inoperative by the notches 247 and 248.

The detent plunger 243 is shown located in the central position in socket 245 in FIG. 11. The detent plunger 243 comprises a cylindrical plunger mounted in a cylindrical bore 249 in the valve supporting body 111, which also has a counterbore 250 for receiving the detent spring 251 which engages an annular ring 252 about the guide 253 and reacts against a plug 254 mounted in a counterbore 255 and provided with a rubber O ring 256 in an annular groove 257.

The threads 113 on the valve supporting body 111 are engaged by the rear sheath 114 to secure the plug 254 in the counterbore 255.

The water admitted by the water valve 175 from the bore 234 passes into the space surrounding the reduced stem 226 and passes through an aperture 258 into the space 259 surrounding electric heater.

The bore 151 in the valve selector 141 contains the air which is supplied to the air nozzle; but the air is separated from the water in the space 257 by the water jacket 260, which comprises a metal sleeve fitting in a bore 261 in the valve supporting body 111.

The water jacket extends to the left to a water conducting tube 262 which has an inner cylindrical bore 263 and an enlarged cylindrical head 264 that has a smaller cylindrical surface 265 fitting in the water jacket 260.

The tubular conduit 262 has its bore 263 in communication with the conduit 43 through the piston head 266 which is located in an enlarged bore 267 provided with an annular groove 268 and a rubber O ring 269. This O ring effects a seal at this end of the tube 262 between the inner water and the outer air.

Referring to FIG. 16, the valve supporting body 111 has a cylindrical bore 270 and a larger counterbore 271 for receiving a tubular gland 272 which fits in the bore 271 and has a cylindrical bore 273 and a radial flange 274 engaging the gasket 217, FIG. 16.

A Teflon insulator 275 extends into the bore 273 and has an external cylindrical surface 276 and an internal bore 277. The Teflon insulator 275 has an annular flange 278 engaging the end of the gland 272 in a bore 240.

The Teflon insulator 275 has a cylindrical contact pin 279 fitting in the bore 277 and provided with a head 280 at its right end to provide a heater terminal and an eccentric cylindrical pin 281 at its left end for adjustment of the position of the leaf spring contacts 282, which engages the eccentric pin 281.

The Teflon insulator 275 has an enlarged counterbore 283, at the left end of which is an anchoring element 284 of cylindrical shape fitted in the counterbore 283 and secured by a transverse pin 285 in a bore 286. The anchoring element 284 has a longitudinally extending flange 287 to which there are riveted a bimetallic thermal element 288 by means of a pair of rivets 289 (FIG. 16).

The thermostatic element 288 comprises a pair of dissimilar metal layers, such as copper or aluminum and steel, so arranged than when the temperature of the thermostatic element 288 is increased, the downwardly bent end 290 of the thermostat engages the leaf spring 282; and thereafter if the temperature increases, the thermostat forces the leaf spring 282 away from the eccentric contact pin 281, breaking the circuit and re-establishing the circuit when the temperature drops.

The temperature at which the circuit is open may be adjusted by rotating the contact pin 279 by means of its head 280.

The anchor element 284 comprises an electric conductor plug having a pair of connector pins 291, only one of which is seen because the other is behind the one shown. The conductor pins 291 are frictionally held in bores 292 in the anchor 284 and project into engagement with the heater wire 293, where they are soldered by hard solder to carry the heating current.

A tubular metal member 294 has an internal bore 295 and an external cylindrical surface 296 forming a heater sheath. The heater sheath 294 is secured on the external cylindrical surface 297 of the Teflon insulator 275; and the heater sheath extends to a closure plug 298 which closes the end of the heater sheath by providing a water-tight plug having a reduced cylindrical surface 299 engaging the inside of the heater sheath.

The heater insulator 300 comprises a plurality of sections of cylindrical ceramic, such as the end member 301 and the longitudinally extending ceramic insulator 302, which has a pair of cylindrical bores 303 and 304 separated by a wall 305 for containing the spiral electric heater wire 306. Two heaters are provided (FIGS. 2 and 16).

Each heater 306 extends from the connector pin 291 down the bore 303 and then into the bore 304 and back to the end 307, which is soldered to the heater sheath 294 outside the Teflon sleeve 275. The water jacket 260 is connected through the sheath to the contact 179 (FIG. 9), which is connected to the terminal 186 so that the heater is on when the plunger 179 is depressed into engagement with the terminal at 184. Both heaters are connected in parallel.

The electric heaters 306 are arranged to consume 100 watts which is supplied at 18 volts by means of a transformer having a full primary and a secondary insulated from each other so that the syringe is insulated from the 110 volt circuit to eliminate possibility of grounding the 110 volt circuit.

Thus both the doctor and the patient can be assured that there is no danger of shock from any use of the instrument.

The thermostat and the heating element are closely coupled and supported by the same anchor 284 so that the thermostat is made responsive to the temperature of the heating element itself.

All the heat developed is absorbed by the water surrounding the heating element; and the control rate depends upon the temperature absorption by the water jacket. Large variations in point of time in the rate of flow of heat from the heating element to the water are avoided. The temperature variation may be controlled between 3 and 5 degrees F.

Since the heater and thermostat are assembled in a single housing, comprising the heater sheath, this assembly can be detached from the syringe by unscrewing the rear sheath. When replacement is required for the heater thermostat assembly, this may be unscrewed and a replacement may be screwed in place.

The outer surface of the sheath 21 will be made of black nickel to take advantage of the greater radiation rate from a dark surface.

The spout may be detached from the syringe by releasing the chuck to loosen the jaws that engage the flange at the end of the spout.

A spray bottle containing medication used by many dentists may be attached to the syringe to spray the mouth prior to the commencement of dental procedure.

Water has been chilled to a temperature of 35 degrees F. and introduced into the syringe; and when the heaters are turned on, the temperatures measured at the spout outlet were controlled between 95 degrees F. and 98 degrees F., even though the cold water was supplied continuously to the syringe.

Upon stopping the water flow with the heater on, the outer surface temperature of the syringe does not attain a value higher than 105 degrees F.

It will thus be observed that we have invented a six-way syringe which is adapted to provide warm water, warm air, or a warm spray of air and water, as well as cold water, cold air, or a cold spray of air and water at the will of the dentist.

The dentist may perform all of his operations with one instrument, as required by his customary operative techniques, thereby eliminating the multiplicity of separate instruments, and eliminating the necessity of picking up separate instruments to accomplish different functions.

While we have illustrated a preferred embodiment of our invention, many modifications may be made without departing from the spirit of the invention; and we do not wish to be limited to the precise details of construction set forth, but desire to avail ourselves of all changes within the scope of the appended claims.

Having thus described our invention, what we claim as new and desire to secure by Letters Patent of the United States is:

1. A dental syringe comprising a tubular handle having separate air and water passages therein, a pair of normally-closed valve members mounted for independent axial movement within said handle for controlling the flow of water and air through said passages, a valve selector body mounted within said handle for axial and rotational movement therein, said body being rotatable between a first position registrable with said water valve member, a second position registrable with said air valve member, and a third position registrable with both of said valve members, said body being axially movable for selectively engaging and unseating the valve members in register therewith, a first control member operatively associated with said body and being movable to shift said body axially into contact with said valve members for unseating the same, a second control member also operatively associated with said body and being movable to rotate said body into register with selected valve members, said control members both having portions extending externally of said handle on generally opposite sides thereof for permitting one-handed and substantially simultaneous manipulation thereof by a user, and an electric heating element disposed within said water passage, said air passage extending concentrically about said water passage in the zone of said heating element for the heating of air passing through said handle and for the insulating of said handle against heat from said element.

2. A dental syringe comprising a tubular handle having separate air and water passages therein, a pair of normally-closed valve members mounted for independent axial movement within said handle for controlling the flow of water and air through said passages, a valve selector body mounted within said handle for axial and rotational movement therein, said body being rotatable between a first position registrable with said water valve member, a second position registrable with said air valve member, and a third position registrable with both of said valve members, said body being axially movable for selectively engaging and unseating the valve members in register therewith, a first control member operatively associated with said body and being movable to shift said body axially into contact with said valve members for unseating the same, a second control member also operatively associated with said body and being movable to rotate said body into register with selected valve members, said control members both having portions extending externally of said handle on generally opposite sides thereof for permitting one-handed and substantially simultaneous manipulation thereof by a user, said handle being provided at one end thereof with a head having a removable nozzle extension thereon, said head being provided with a tapered shank, said nozzle extension removably receiving said shank and having an external shoulder, a pair of jaws provided by said head and being movable between clamping positions engaging said shoulder and holding said nozzle extension tightly upon said head and releasing positions spaced outwardly from said shoulder and permitting removal of said extension from said head, and means provided by said head and engageable with said jaws for moving the same between releasing and clamping positions.

3. A dental syringe comprising a tubular handle having separate air and water passages therein, a water valve disposed within said handle for controlling the flow of water through said water passage and having a normally seated valve member, an air valve disposed within said handle for controlling the flow of air through said air passage and having a normally seated valve member, a valve selector body mounted within said handle for axial and rotational movement therein and having axial extensions projecting towards said valve members, said body being rotatable between a first position wherein said extensions are axially aligned only with said water valve member, a second position wherein said extensions are axially aligned only with said air valve member, and a third position wherein said extensions are axially aligned with both of said valve members, said body being axially movable for engaging and unseating the valve members in axial alignment with the extensions thereof, a first control member operatively associated with said body and being movable to shift said body axially into engagement with said valve members for unseating the same, and a second control member also operatively associated with said body and being movable to rotate said body into any of said three positions, said control members both having portions thereof extending externally of said handle on generally opposite sides thereof for permitting one-handed and substantially simultaneous manipulation of said members, and an electric heating element being disposed within said water passage, said air passage extending concentrically about said water passage in the zone of said heating element for the heating of air passing through said handle and for the insulating of said handle against heat from said element, and a thermostatic switch controlling energization of said heating element and being in direct heat conductive relation therewith through a common metallic anchor block, whereby, said thermostatic switch is directly responsive to the temperature of said heating element, which increases when the flow of water diminishes and decreases when the flow of water increases, to maintain a substantially constant water temperature.

4. A dental syringe comprising a tubular handle having separate air and water passages therein, a water valve disposed within said handle for controlling the flow of water through said water passage and having a normally seated valve member, an air valve disposed within said handle for controlling the flow of air through said air passage and having a normally seated valve member, a valve selector body mounted within said handle for axial and rotational movement therein and having axial extensions projecting towards said valve members, said body being rotatable between a first position wherein said extensions are axially aligned only with said water valve member, a second position wherein said extensions are axially aligned only with said air valve member, and a third position wherein said extensions are axially aligned with both of said valve members, said body being axially movable for engaging and unseating the valve members in axial alignment with the extensions thereof, a first control member operatively associated with said body and being movable to shift said body axially into engagement with said valve members for unseating the same, and a second control member also operatively associated with said body and being movable to rotate said body into any of said three positions, said control members both having portions thereof extending externally of said handle on generally opposite sides thereof for permitting one-handed and substantially simultaneous manipulation of said members, said handle being provided at one end thereof with a head having a removable nozzle extension thereon, said head being provided with a tapered shank, said nozzle extension removably receiving said shank, a pair of jaws provided by said head and being movable between clamping positions engaging the sides of said nozzle extension and releasing positions spaced outwardly from said extension, and means provided by said head and engageable with said jaws for moving said jaws between releasing and clamping positions.

5. The structure of claim 3 in which said handle is also provided with a rotatable collar in proximity with said control members, and having an internal camming portion, and an electric switch in circuit with said heating element and engageable by said camming portion for energizing and de-energizing said heating element upon rotation of said collar.

6. A dental syringe comprising a tubular handle having separate air and water passages therein, a pair of normally closed valve members mounted for independent axial movement within said handle for controlling the flow of water and air through said passages, a valve selector body mounted within said handle for axial and rotational movement therein, said body being rotatable between a first position registrable with said water valve member, a second position registrable with said air valve member, and a third position registrable with both of said valve members, said body being axially movable for selectively engaging and unseating the valve members in register therewith, a first control member operatively associated with said body and being movable to shift said body axially into contact with said valve members for unseating the same, a second control member also operatively associated with said body and being movable to rotate said body into register with selected valve members, said control members both having portions extending externally of said handle on generally opposite sides thereof for permitting one-handed and substantially simultaneous manipulation thereof by a user, an electric heating element being disposed within said water passage, said air passage extending along said water passage within said handle, an external collar rotatably mounted upon said handle in proximity to said control members and having an internal camming portion, and an electric switch in circuit with said heating element and engagable by said camming portion for energizing and de-energizing said heating element upon rotation of said collar.

References Cited by the Examiner

UNITED STATES PATENTS

| 1,995,302 | 3/1935 | Goldstein | 128—401 X |
| 2,034,367 | 3/1936 | Angell | 128—229 |
| 2,085,470 | 6/1937 | Pieper | 128—254 X |
| 2,104,670 | 1/1938 | Pieper | 128—401 X |
| 2,322,157 | 6/1943 | Porter | 137—635 |
| 2,523,809 | 9/1950 | Bronk et al. | 128—239 |
| 2,568,444 | 9/1951 | Giuliano | 137—635 |
| 2,777,445 | 1/1957 | Hart | 128—401 |
| 3,054,402 | 9/1962 | Franwick et al. | 128—229 |

FOREIGN PATENTS

| 876,138 | 5/1953 | Germany. |
| 795,283 | 5/1958 | Great Britain. |

RICHARD A. GAUDET, *Primary Examiner.*

JORDAN FRANKLIN, *Examiner.*

RENE D. TEGTMEYER, DANIEL S. BURKS,
*Assistant Examiners.*